March 7, 1939.                J. A. CAMERON                2,149,272
                                 CAR TRUCK
                           Filed Jan. 17, 1935            2 Sheets-Sheet 1
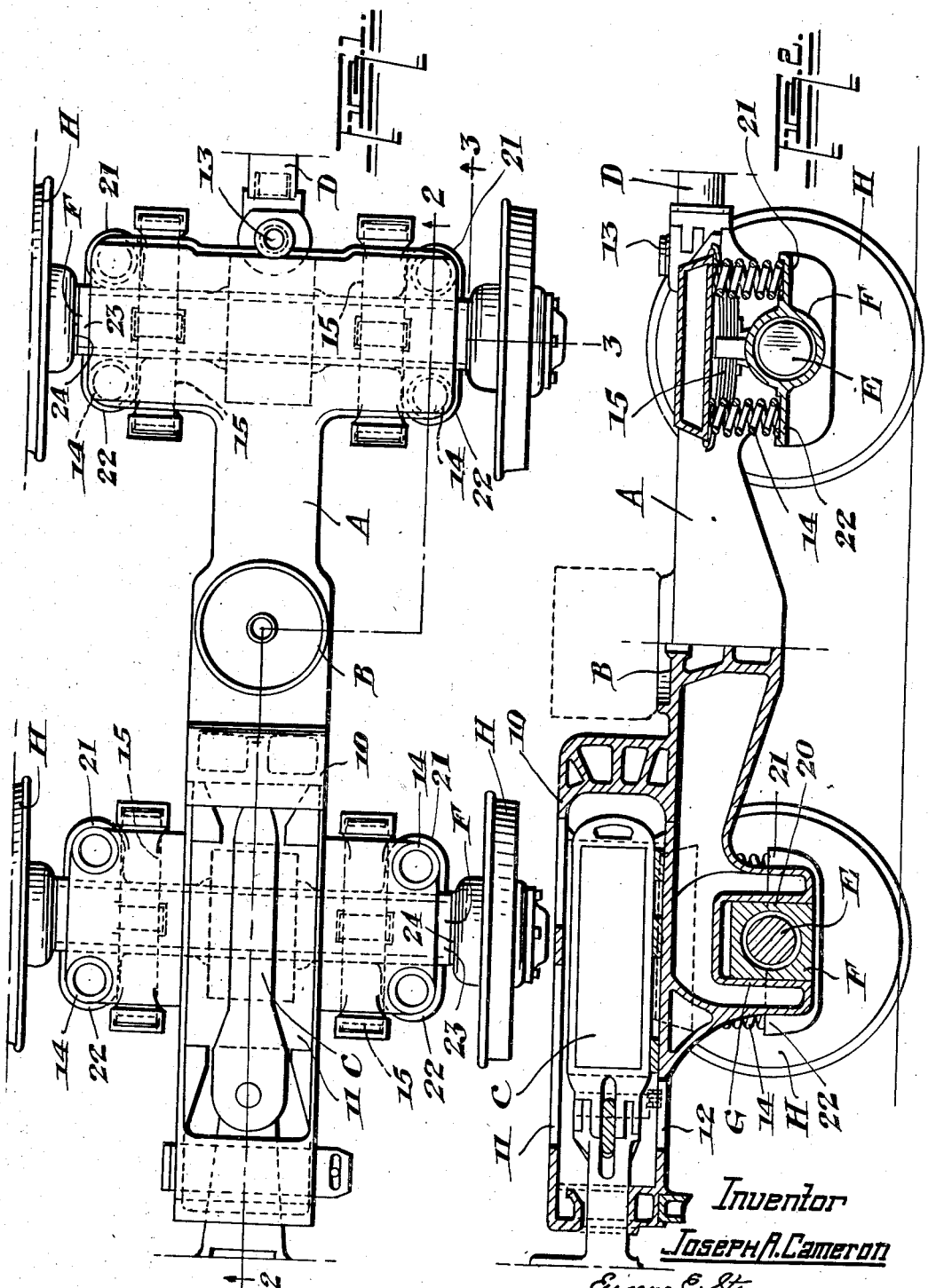
Inventor
Joseph A. Cameron
BY Eugene E. Stevens Attys.

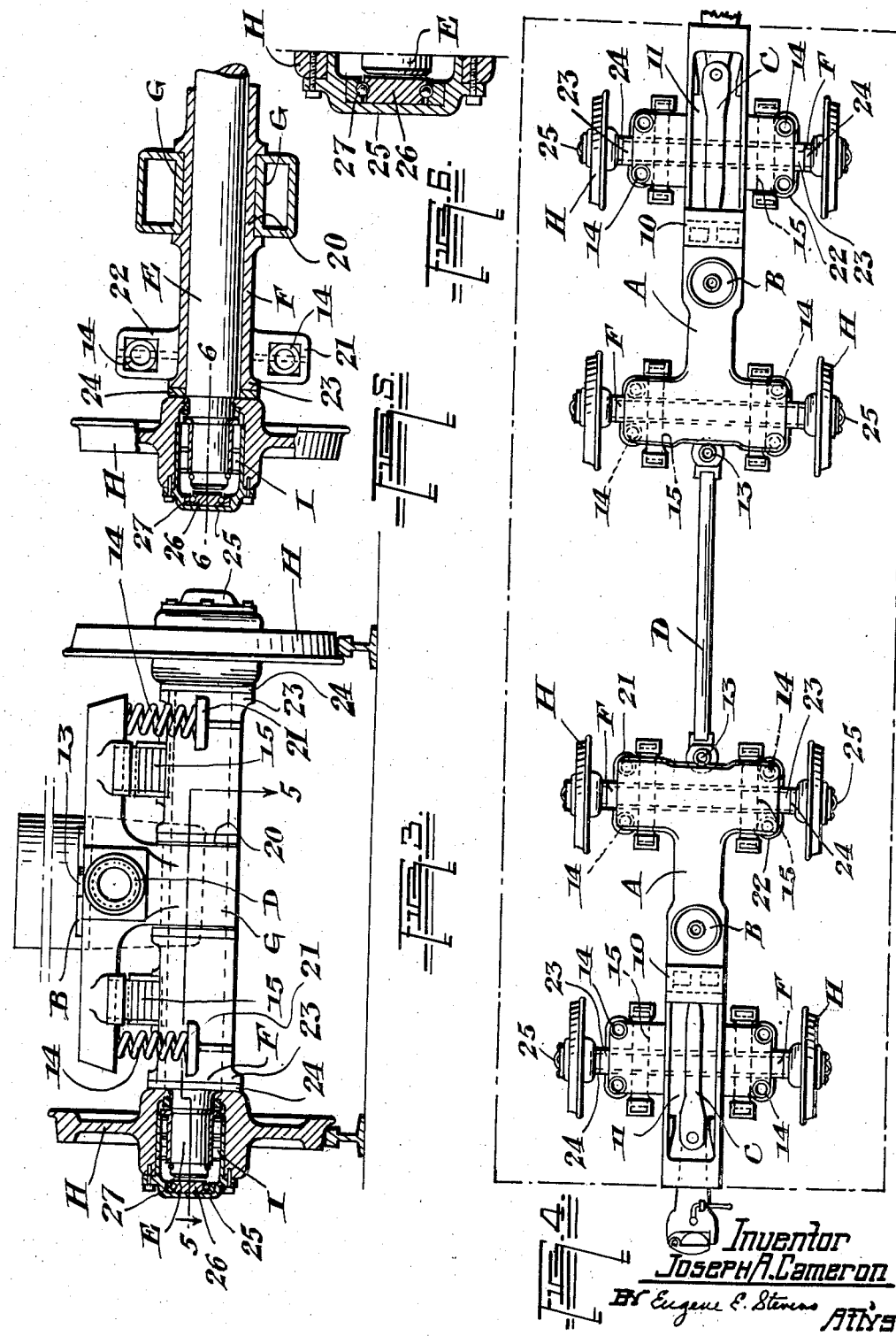

Patented Mar. 7, 1939

2,149,272

UNITED STATES PATENT OFFICE 2,149,272

CAR TRUCK

Joseph Ashmore Cameron, Montreal, Quebec, Canada, assignor to The Symington-Gould Corporation, Rochester, N. Y., a corporation of Maryland Application January 17, 1935, Serial No. 2,272

15 Claims. (Cl. 105—176)

This invention relates to improvements in car trucks and the general objects of the invention are to lighten the car body construction and to take buffing and pulling shocks from the car body.

Further objects of the invention are to eliminate the skid of opposite wheels on curves and to provide for the more efficient mounting and springing of the wheels and car axles.

One of the main characteristics of the present invention is the elimination of the usual truck side frame which very substantially lightens the car body construction. Another characteristic is the provision on the car truck of draught and coupling attachments built integrally therewith, which take the buffing and pulling shocks from the car body.

In its construction the invention includes a longitudinally extending member or bolster having spaced transversely extending supporting members for the car axle and having coupling attachments at opposite ends, the trucks of the same car being connected by an articulated connecting member, all of which is more fully hereinafter set out and described in the accompanying specification and drawings.

In the drawings,

Fig. 1 is a plan view of a single car truck embodying the present invention.

Fig. 2 is a sectional elevation taken on the line 2—2 of Fig. 1.

Fig. 3 is a sectional elevation on the line 3—3 of Fig. 1.

Fig. 4 is a plan view showing two trucks and the car body in dotted lines.

Fig. 5 is a section on the line 5—5 of Fig. 3.

Fig. 6 is a sectional detail of the end of the car axle taken on the line 6—6 of Fig. 5.

In the drawings, like characters of reference represent corresponding parts in all the figures.

Referring to the drawings, A indicates a central, longitudinally extending member or bolster, conveniently constructed from hollow cast or built up plate metal with reinforced interior webbing provided at its centre with a centre plate bearing B of similar form to that usually found in the ordinary car bolster and designed to receive a body centre plate and centre pin on the underside of the car body. The body centre plate and centre pin usually have a supporting bolster which may be of any convenient design and is indicated in dotted lines only in Fig. 2.

The member A is formed with coupling connecting attachments at opposite ends whereby adjacent cars may be connected together and the two trucks on a single car connected together. In the form shown in Figs. 1 and 2 an upwardly projecting housing 10 is formed at one end of the bolster A designed to house and support one member C of a standard car coupler, the housing having apertures 11 and 12 at the top and bottom through which access may be had to the parts of the coupler unit, the end of the housing 10 projecting a distance beyond the end of the bolster.

The opposite end of the bolster A to that at which the housing 10 is mounted is connected to a connecting rod or bar D which has an articulated or swivelled connection 13 with the bolster A, a similar connection being provided on the bolster of the next car truck whereby the buff will be transmitted to the car trucks independently of the car body, which will be relieved of the strains thereof.

E indicates the car axles which extend through housings F, vertically movable with respect to the bolster A in suitable guideways G, and supporting coil springs 14 and elliptical springs 15. In some circumstances either the coil or elliptical springs might be used alone.

Each of the axle housings F is tubular in form and extends from one end to the other of the axle, being provided at the centre with a square portion 20 which fits the guideways G formed on the member A. At opposite ends each of the axle housings F is formed with laterally projecting spring seats 21 and 22, which extend on opposite sides and are designed to seat the coil springs 14. The ends of the members are flanged at 23 and the flanges may abut the wheels H or preferably a washer plate 24 may be inserted between the flanges and the wheels. It will be seen that the movement of the wheels towards each other is limited by the ends of the axle housing, which thereby assists in preserving an accurate gauge between the wheels.

The wheels H are independently rotatable on the axle E and are preferably provided with roller bearings I of any convenient design. The car wheels are thus able to move independently of each other at all times, eliminating skid of opposite wheels when on curves or where there is variation in wheel diameter.

At some times during the motion of the car the slight, lateral movement of the wheels may cause the end of the axle to bear against the end plate 25 of the roller bearing, and to reduce any friction that may result I preferably provide on the said end plate a bearing disc or plate 26 mounted in a roller bearing race 27 of any convenient design, so that when the end of the axle comes in contact with the plate 26, the latter may turn freely.

It will be appreciated that the elimination of the usual truck side frames will very materially lighten the car body construction and the arrangement of the bolsters pivotally connected with the car body and having articulated connections with each other and draught connections at opposite ends will relieve the car body from buffing and pulling shocks and enable the trucks to effectively follow the track alignment.

It will be seen that each of the car trucks herein shown consists only of three major elements, namely the bolster A and the two car axle housings F which may be readily assembled together and when so assembled will effectively support the car and wheels in the manner already described.

Various modifications may be made in the invention without departing from the spirit thereof or the scope of the claims and therefore the exact forms shown are to be taken as illustrative only and not in a limiting sense, and I desire that only such limitations shall be placed thereon as are imposed by the prior art or are specifically set forth in the appended claims.

What I claim as my invention is:

1. A car truck comprising a central longitudinally extending member, transversely extending supporting members spaced apart longitudinally of the truck for supporting the truck from the car wheels, said member being spaced laterally from the car wheels, said supporting members projecting on each side of said longitudinally extending member to a point adjacent to the wheels, and an upwardly extending housing at one end of the longitudinally extending member forming a continuation of said central member adapted to receive a draught attachment.

2. A car truck comprising a central longitudinally extending bolster spaced laterally from the truck wheels, pedestal ways mounted on said bolster, and housings for the car axles detachably mounted on the pedestal ways and extending approximately the full distance between wheels on said axles, and supporting spring means interposed between said bolster and housings.

3. A car truck comprising a central longitudinally extending bolster spaced laterally from the truck wheels, pedestal ways mounted on said bolster, housings for the car axles detachably mounted on the pedestal ways, draught attachments connected to the bolster, and lateral extensions on the bolster directly overlying the truck axles for engaging supporting springs.

4. A car truck comprising a central longitudinally extending bolster spaced laterally from the truck wheels, pedestal ways mounted on said bolster, housings for the car axles detachably mounted on the pedestal ways and springs between the housings and lateral extensions at the ends of the bolster.

5. A car truck comprising a central longitudinally extending bolster, pedestal ways mounted thereon, housings for the car axles mounted on the pedestal ways and extending approximately from wheel to wheel, and elliptical and coil springs between the housings and lateral extensions on the bolster.

6. A car body construction comprising a plurality of car trucks, each having axles, wheels thereon, and a central longitudinally extending bolster with arms extending laterally and overlying said axles, and an articulated connection aligned with said bolster and extending between adjacent trucks.

7. A car body construction comprising a pair of trucks, each having axles, wheels thereon, and a longitudinally extending bolster with laterally extending arms overlying said axles, a connecting bar between the trucks normally aligned with said bolster and having a swivelling connection with each bolster, and draught and coupling attachments on the trucks.

8. A car truck comprising axles, wheels thereon, and a longitudinally extending bolster having two guideways on the under-side thereof, car axle housings extending approximately from wheel to wheel and vertically slidable in the guideways, means extending laterally of the truck from said bolster and spring means acting between the said means and the axle housings.

9. A car truck comprising wheels, axles, a central longitudinally extending hollow bolster spaced laterally from the wheels having guideways on the under-side and having laterally extending spring seats projecting from the bolster to a point adjacent to said wheels, car axle housings encasing said axles and mounted in the guideways, said housings having spring seats extending laterally therefrom, and springs extending between the spring seats on the bolster and the housings.

10. A car truck comprising wheels, axles, a central longitudinally extending hollow bolster spaced laterally from the wheels, having guideways on the under-side and having laterally extending spring seats projecting from the bolster to a point adjacent to said wheels, car axle housings encasing said axles and mounted in the guideways, said housings having spring seats extending laterally therefrom, springs extending between the spring seats on the bolster and the housings, and draught means connected to opposite ends of the bolster.

11. A car truck comprising wheels, associated axles, and a central longitudinally extending member with transversely extending supporting arms spaced apart longitudinally of the truck so as to directly overlie said axles, supporting means associated with the axles and slidably connected to said arms, said member being spaced laterally from the wheels, and said arms projecting on each side of the longitudinally extending member to a point adjacent to the wheels.

12. A car truck comprising wheels, associated axles, and a centrally disposed longitudinally extending hollow bolster with reinforced webbing, lateral extensions at opposite ends thereof spaced apart longitudinally of the truck so as to each directly overlie an axle, and supporting members connected to and positioned below the lateral extensions for supporting the truck from the car wheels.

13. A car truck comprising wheels, axles, a central longitudinally extending bolster having lateral extensions connected to the axles, said bolster being adapted to move vertically with respect to the axles and spaced laterally from the wheels, said extensions projecting from the bolster over the axles and coil springs between the axles and the extensions, said springs being positioned intermediate the wheels and longitudinally extending bolster.

14. A car truck comprising wheels, axles, a central longitudinally extending bolster spaced laterally from the car wheels, pedestal ways mounted on the bolster, lateral extensions on the bolster, housings for the car axles slidably engaging the pedestal ways, and resilient means interposed between the lateral extensions and housings.

15. A car truck comprising a central longitudinally extending member, transversely extending supporting members spaced apart longitudinally of the truck for supporting the longitudinally extending member from the car wheels, lateral extensions on said longitudinal member directly overlying said supporting members, said supporting members projecting on each side of said longitudinally extending member to a point adjacent to the wheels, and resilient means positioned intermediate the wheels and longitudinally extending member, said resilient means being interposed between said lateral extensions and supporting members.

JOSEPH ASHMORE CAMERON.